(12) United States Patent
Takakura et al.

(10) Patent No.: US 10,752,098 B2
(45) Date of Patent: Aug. 25, 2020

(54) LIFTING GUIDE MECHANISM FOR SUNROOF DEVICE

(71) Applicant: Yachiyo Industry Co., Ltd., Sayama-shi, Saitama (JP)

(72) Inventors: Sou Takakura, Sakura (JP); Tsutomu Iwaya, Utsunomiya (JP)

(73) Assignee: Yachiyo Industry Co., Ltd., Sayama-shi, Saitama (JP)

( * ) Notice: Subject to any disclaimer, the term of this patent is extended or adjusted under 35 U.S.C. 154(b) by 0 days.

(21) Appl. No.: 16/481,235

(22) PCT Filed: Dec. 21, 2017

(86) PCT No.: PCT/JP2017/045962
§ 371 (c)(1),
(2) Date: Jul. 26, 2019

(87) PCT Pub. No.: WO2018/146956
PCT Pub. Date: Aug. 16, 2018

(65) Prior Publication Data
US 2019/0366816 A1  Dec. 5, 2019

(30) Foreign Application Priority Data

Feb. 10, 2017 (JP) .................................. 2017-023522

(51) Int. Cl.
*B60J 7/05* (2006.01)
*B60J 7/00* (2006.01)
(Continued)

(52) U.S. Cl.
CPC ............... *B60J 7/05* (2013.01); *B60J 7/0084* (2013.01); *B60J 7/022* (2013.01); *B60J 7/0435* (2013.01); *B60J 7/192* (2013.01); *B60J 7/22* (2013.01)

(58) Field of Classification Search
CPC ..... B60J 7/05; B60J 7/053; B60J 7/024; B60J 7/022
(Continued)

(56) References Cited

U.S. PATENT DOCUMENTS 9,579,958 B2 * 2/2017 Ide .......................... B60J 7/0573
296/216.02
2009/0072588 A1 3/2009 Nakamura

FOREIGN PATENT DOCUMENTS

DE 202012102650 8/2012
JP 2002166727 6/2002
(Continued)

OTHER PUBLICATIONS

International Search Report for PCT/JP2017/045962 dated Jan. 16, 2018, 2 pages.

*Primary Examiner* — Dennis H Pedder
(74) *Attorney, Agent, or Firm* — Dority & Manning, P.A.

(57) ABSTRACT

A lifting guide mechanism for a sunroof device that can be reduced in weight, thickness, and cost is provided. A second rear guide pin (27) is provided behind and above a first rear guide pin (26) which can be received in a guide groove (34). A first upper wall (32) is formed with a rear opening part (36) to allow the first rear guide pin (26) to get in and out of the guide groove (34). A first rear lifting guide member (39) is provided on the first upper wall (32) so as to project upward at rear of the rear opening part (36) to guide the second rear guide pin (27) when a movement of a movable panel (11) is switched between sliding and tilting. This eliminates the need for a member for guiding the first rear guide pin (26) in the guide groove (34), and thus, the panel guide rail (14) may have a single-level structure.

6 Claims, 10 Drawing Sheets (51) Int. Cl.
*B60J 7/02* (2006.01)
*B60J 7/043* (2006.01)
*B60J 7/19* (2006.01)
*B60J 7/22* (2006.01)

(58) Field of Classification Search
USPC .......................................... 296/221, 222, 223
See application file for complete search history.

(56) References Cited

FOREIGN PATENT DOCUMENTS

| | | |
|---|---|---|
| JP | 2009090966 | 4/2009 |
| JP | 2013216237 | 10/2013 |

* cited by examiner

LIFTING GUIDE MECHANISM FOR SUNROOF DEVICE

CROSS REFERENCE TO RELATED APPLICATIONS

This application is the U.S. National Stage entry of International Application Number PCT/JP2017/045962 filed under the Patent Cooperation Treaty having a filing date of Dec. 21, 2017, which claims priority to Japanese Patent Application No. 2017-023522 having a filing date of Feb. 10, 2017, which are incorporated herein by reference.

TECHNICAL FIELD

The present disclosure relates to a lifting guide mechanism for a sunroof device, and particularly to a lifting guide mechanism for an inner-slide sunroof device having a movable panel configured to slide under a roof.

BACKGROUND ART

As an inner-slide sunroof device, there is known a sunroof device, in which a rear cam boss is provided on a rear part of a panel bracket attached to each side edge of a sunroof panel, a channel-shaped guide rail defining a rear boss guide groove that opens laterally to guide the rear cam boss is provided on a roof, and a rear guide member forming a cam groove is attached to a part of the guide rail at which an upper wall thereof is partly removed (Patent Document 1). In this sunroof device, the rear cam boss slidably engaging the rear boss guide groove is guided by the rear guide member such that transition between a tilting operation and a horizontal movement operation of the sunroof panel is performed smoothly.

PRIOR ART DOCUMENT(S)

Patent Document(S)

Patent Document 1: JP2009-90966A

SUMMARY OF THE INVENTION

Task to be Accomplished by the Invention

However, in the sunroof device described in Patent Document 1, the rear guide member is provided in the rear boss guide groove of the guide rail. Therefore, in order to prevent the rear slider supporting the rear part of the panel bracket from interfering with the rear guide member, it is necessary to configure the rear slider to slide under the rear boss guide groove, namely, to configure the guide rail to have a multi-level structure, and this is disadvantageous in reducing the weight, thickness, and cost.

In view of such background, an object of the present invention is to provide a lifting guide mechanism for a sunroof device that can be reduced in weight, thickness, and cost.

Means to Accomplish the Task

Figure 9:
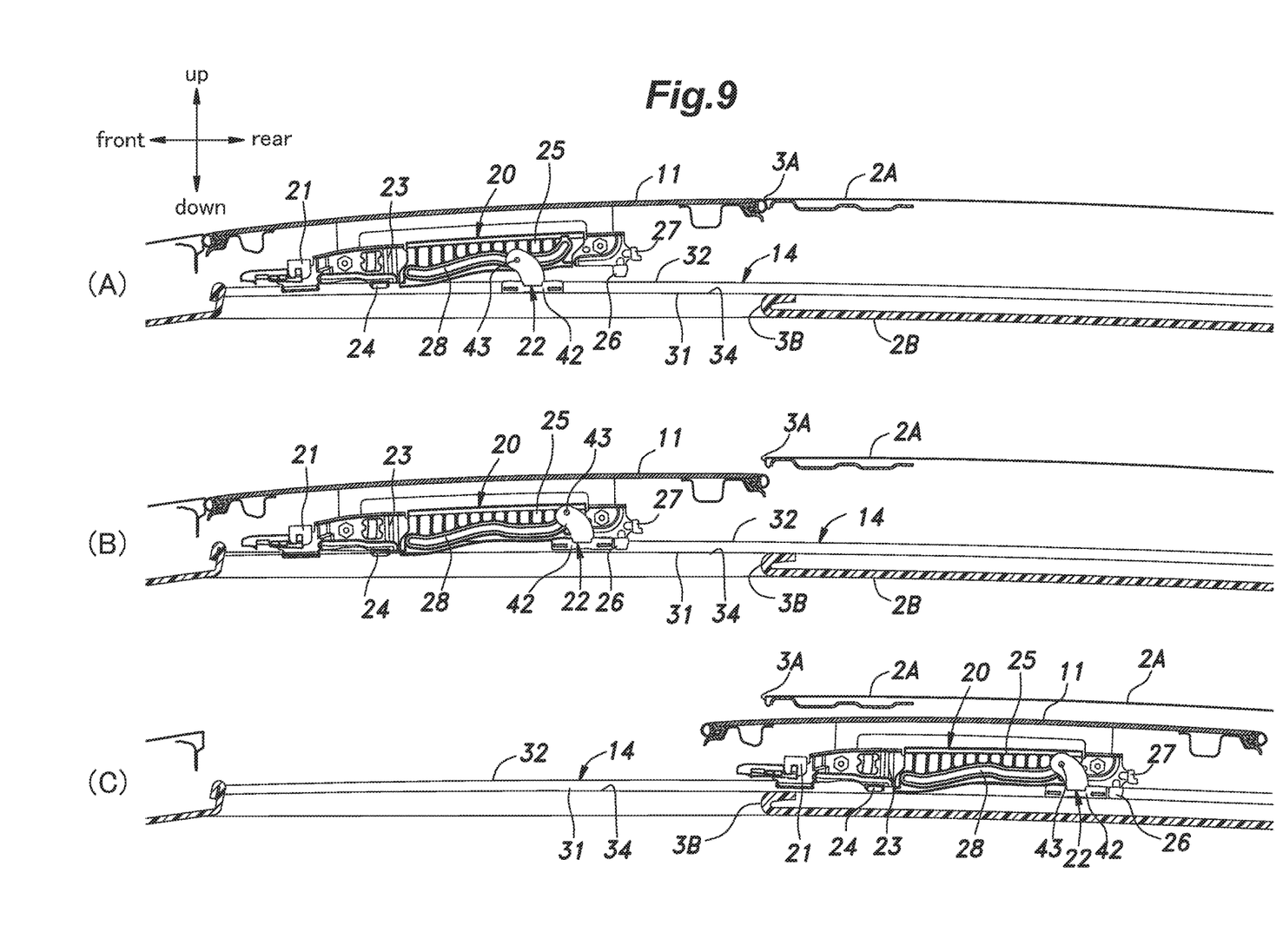
FIG. 9 is a left side view showing an opening and closing operation of the sunroof device.
Figure 10:
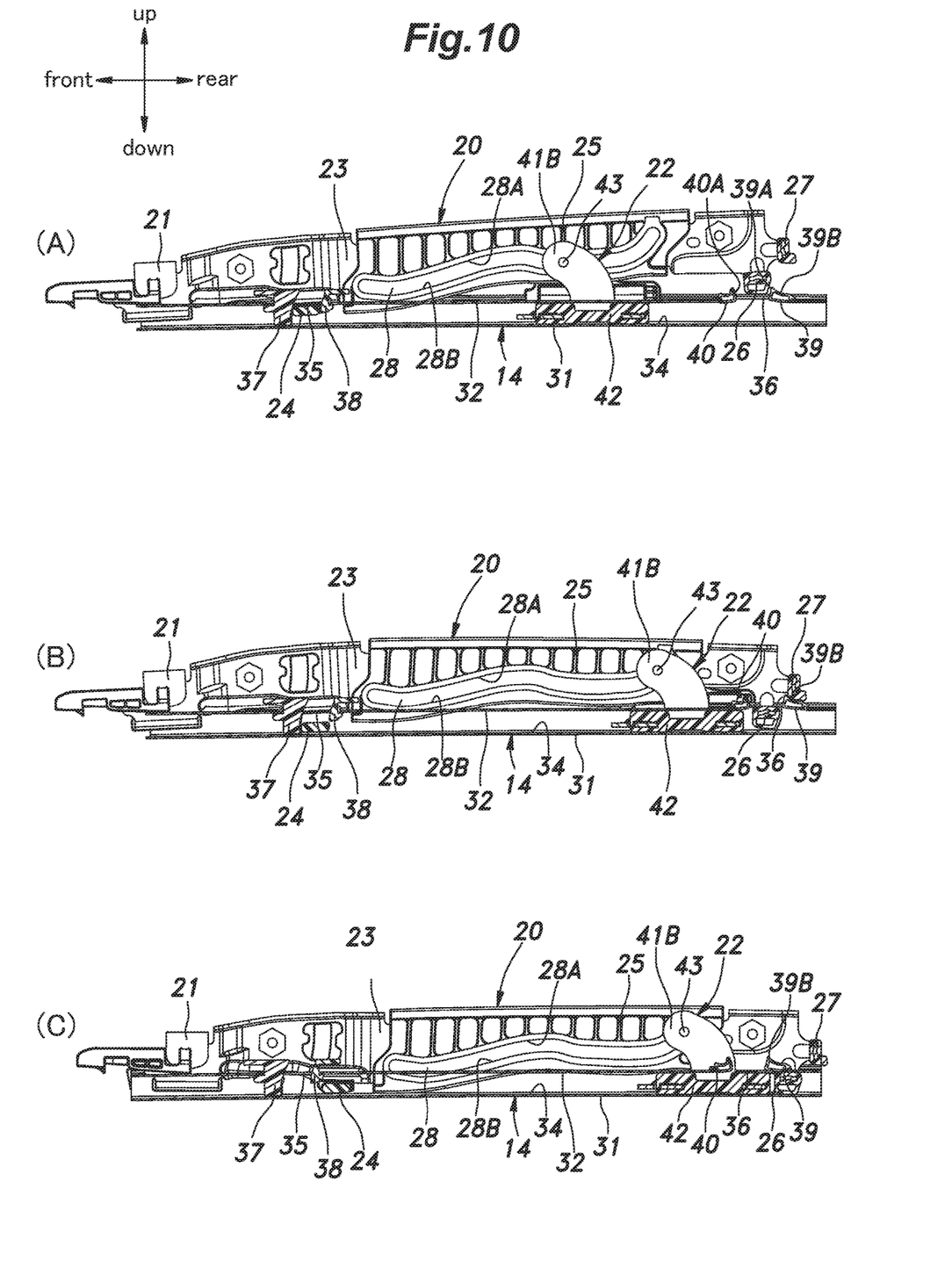
FIG. 10 is an enlarged view of a cam mechanism part when the sunroof device undergoes the opening and closing operation.

To achieve such an object, one embodiment of the present invention provides lifting guide mechanism for an inner-slide sunroof device (10), the sunroof device comprising: a movable panel (11) for opening and closing an opening (3A) formed in a roof (2) of a vehicle (1); a guide rail (14) mounted to the roof and having an upper wall (32) and a bottom wall (31) to define a laterally opening guide groove (34); a slider (22) slidably provided in the guide groove; and a panel stay (20) secured to the movable panel (11) and configured to move in connection with sliding of the slider, wherein, in accordance with a movement of the panel stay in connection with sliding of the slider, the movable panel is lifted or tilted between a closed position (part (A) of FIG. 9, part (A) of FIG. 10) in which the opening (3A) is closed and a down position (part (B) of FIG. 9, part (B) of FIG. 10) that is lower than the closed position, and is caused to slide between the down position and an open position (part (C) of FIG. 9, part (C) of FIG. 10) which is behind the down position and in which the opening is opened, the lifting guide mechanism comprising: a first guide pin (26) provided on a rear part of the panel stay so as to project laterally and received in the guide groove when the movable panel is positioned between the down position and the open position; a second guide pin (27) provided on a part of the panel stay adjacent to the first guide pin in a rearward and upward direction so as to project laterally, the second guide pin being positioned above the upper wall when the movable panel is positioned between the down position and the open position; an opening part (36) formed in the upper wall to allow the first guide pin to get in and out of the guide groove when the movable panel moves between the down position and the closed position; and a first lifting guide member (39) provided on the upper wall so as to project upward at rear of the opening part to guide the second guide pin when a movement of the movable panel is switched between sliding and lifting or tilting.

According to this configuration, when the movement of the movable panel is switched between sliding and lifting or sliding, the second guide pin is guided by the first lifting guide member, and therefore, there is no need for a member for guiding the first guide pin in the groove. Consequently, it is possible to configure the guide rail to have a single-level structure in that the slider and the first guide pin are guided in the common guide groove. Thereby, it is possible to reduce the weight, thickness, and cost of the lifting guide mechanism for a sunroof device.

In the above configuration, preferably, the first lifting guide member (39) has an inclined upper surface (39B) with which the second guide pin (27) makes sliding contact, the inclined upper surface being curved such that a more forward part thereof has a greater inclination relative to an upper surface of the upper wall (32).

According to this configuration, when the movement of the movable panel is switched between sliding and lifting or tilting, the second guide pin is guided by the curved guide surface of the first lifting guide member, whereby the switching of the movement is performed smoothly.

In the above configuration, preferably, the first lifting guide member (39) has an inclined front surface (39A) that guides a rear part of the first guide pin (26) when the movable panel (11) moves from the closed position to the down position, the inclined front surface including an upper part that is inclined rearward.

According to this configuration, when the movable panel moves from the closed position to the down position, the rear part of the first guide pin is guided by the inclined front surface of the first lifting guide member, whereby the first guide pin enters the guide groove reliably.

In the above configuration, preferably, the lifting guide mechanism further comprises a second lifting guide member (40) provided on the upper wall (32) to project upward at front of the opening part (36) to guide a front part of the first guide pin (26) when the movable panel (11) moves from the closed position to the down position, the second lifting guide member having an inclined rear surface (40A) including an upper part that is inclined forward.

According to this configuration, when the movable panel moves from the closed position to the down position, the front part of the first guide pin is guided by the inclined rear surface of the second lifting guide member, whereby the first guide pin enters the guide groove reliably.

In the above configuration, preferably, the first lifting guide member (39) and the second lifting guide member (40) are parts made of resin having a hollow cross-sectional structure.

According to this configuration, the first lifting guide member and the second lifting guide member can easily undergo elastic deformation, whereby an impact on the first guide pin or the second guide pin can be absorbed by the elastic deformation. Therefore, there is no need to provide an additional impact absorbing member such as a rubber elastic member, and the structure can be simplified.

In the above configuration, preferably, the first lifting guide member (39) and the second lifting guide member (40) are integrally molded.

According to this configuration, the number of components can be reduced, and in addition, the mounting of the first lifting guide member and the second lifting guide member to the guide rail is facilitated.

Effect of the Invention

Thus, according to the present invention, it is possible to provide a lifting guide mechanism for a sunroof device that can be reduced in weight, thickness, and cost.

MODES FOR CARRYING OUT THE INVENTION

In the following, an embodiment of the present invention will be described in detail with reference to the drawings. In the below description, front, rear, left, and right directions are defined with respect to the traveling direction of an automobile 1 to which a sunroof device 10 is mounted. Also, an inner side and an outer side of the sunroof device 10 are defined with respect to a lateral direction (vehicle widthwise direction) of the automobile 1.

Figure 1:
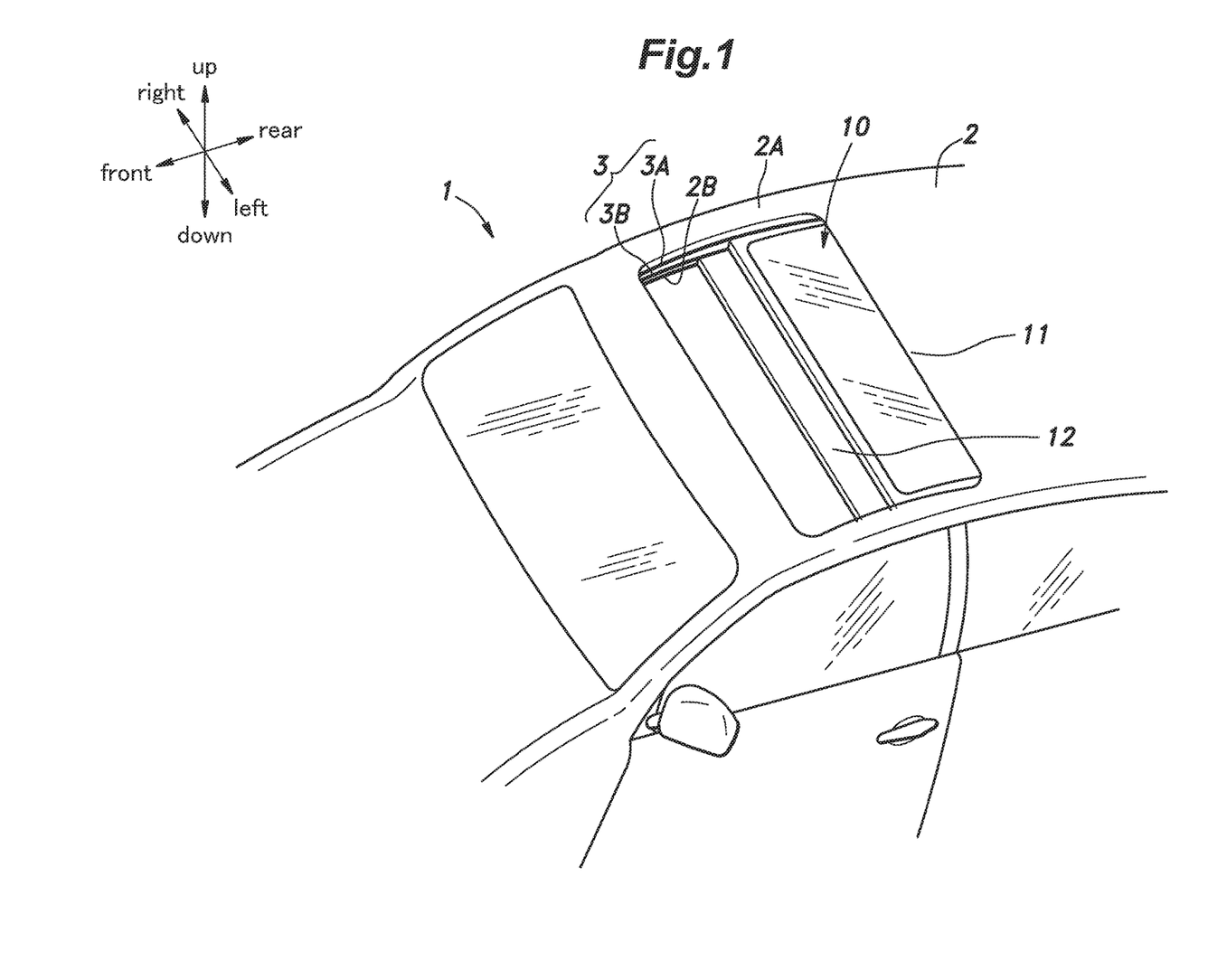
FIG. 1 is a fragmentary perspective view of an automobile including a sunroof device according to an embodiment.

FIG. 1 is a fragmentary perspective view of the automobile 1 including the sunroof device 10 according to the embodiment. As shown in FIG. 1, the inner-slide sunroof device 10 is mounted to the roof 2 of the automobile 1. The roof 2 is constituted of an outer roof panel 2A located on an outer side and a roof lining 2B located on an inner side (cabin side). The outer roof panel 2A is formed with a rectangular upper opening 3A, and the roof lining 2B is formed with a rectangular lower opening 3B. The lower opening 3B is slightly smaller than the upper opening 3A, and is provided at substantially the same position as the upper opening 3A so as to be included in the upper opening 3A in plan view. The upper opening 3A and the lower opening 3B jointly form an opening hole 3 in the roof 2.

The sunroof device 10 includes a movable panel 11 for opening and closing the upper opening 3A of the roof 2 by moving generally in a fore and aft direction, and a shade panel 12 disposed below the movable panel 11 in an overlapping manner to open and close the lower opening 3B by moving in the fore and aft direction.

Figure 2:
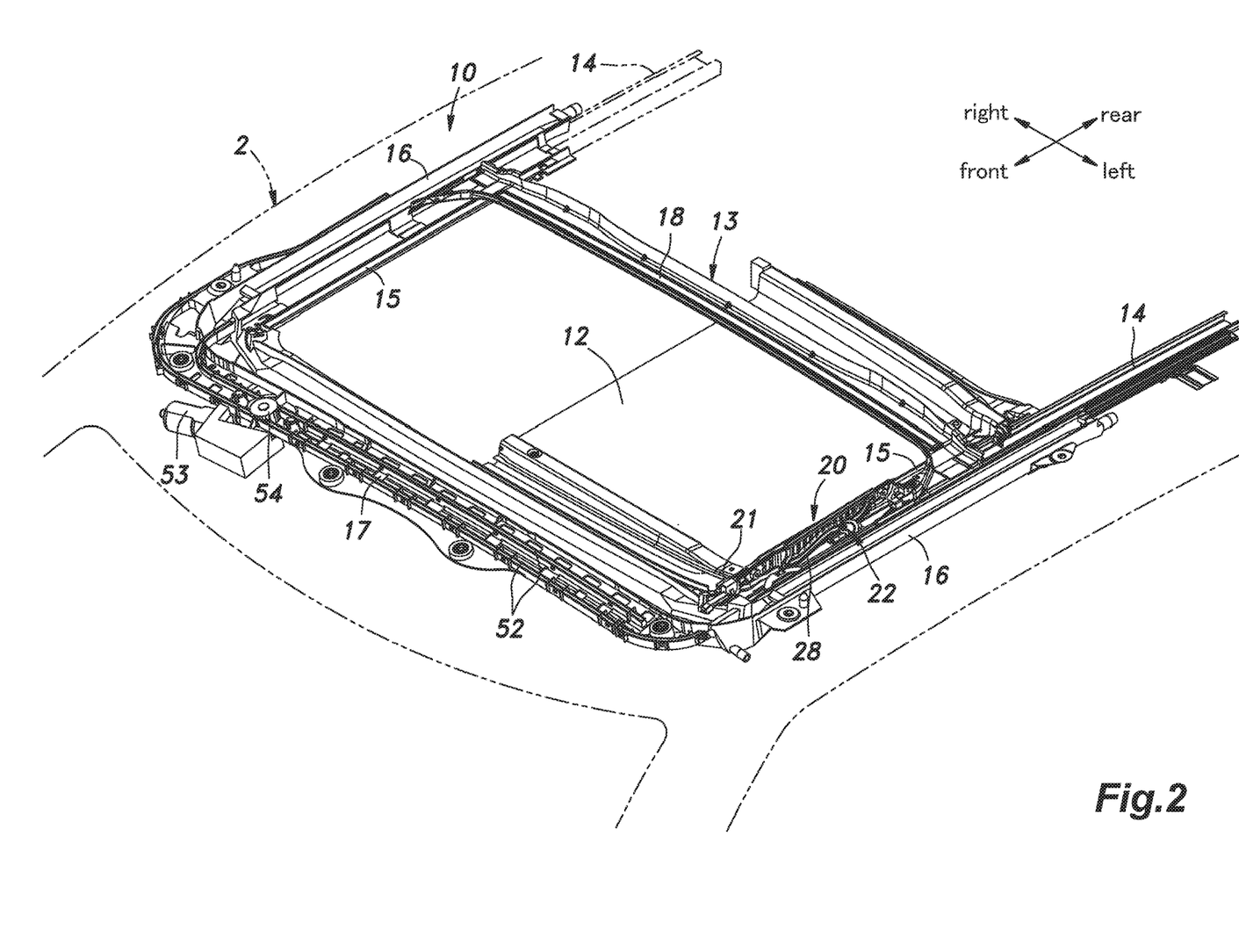
FIG. 2 is a perspective view of the sunroof device shown in FIG. 1.

FIG. 2 is a perspective view of the sunroof device 10 shown in FIG. 1. In FIG. 2, the entire part of the movable panel 11, a right half of the shade panel 12, and a later-described right panel guide rail 14 are omitted from illustration. As shown in FIG. 2, the movable panel 11 and the shade panel 12 are supported by a sunroof frame 13 that is disposed below the upper opening 3A of the outer roof panel 2A, above the roof lining 2B, and outside the lower opening 3B.

The sunroof frame 13 includes left and right panel guide rails 14 made of metal and extending in the fore and aft direction along mutually parallel left and right side edges of the upper opening 3A, respectively. On the inner side of the left and right panel guide rails 14, left and right shade guide rails 15 made of resin are provided to extend in the fore and aft direction along mutually parallel left and right side edges of the lower opening 3B (see FIG. 1), respectively. On the outer side of the panel guide rails 14, left and right side drain rails 16 made of resin are provided to extend in the fore and aft direction along mutually parallel left and right edges of the upper opening 3A. On each of the left and right sides, the shade guide rail 15 and the side drain rail 16 are unified to each other and retain the corresponding panel guide rail 14.

The panel guide rails 14 support the movable panel 11 so as to be movable in the fore and aft direction, and have a fore-and-aft length equal to or greater than twice the fore-and-aft length of the movable panel 11. Each panel guide rail 14 extends over the entire dimension of the upper opening 3A in the fore and aft direction, and further extends rearward from the upper opening 3A. The shade guide rails 15 support the shade panel 12 so as to be movable in the fore and aft direction, and have a fore-and-aft length greater than the fore-and-aft length of the shade panel 12 to extend over the entirety of the upper opening 3A in the fore and aft direction.

The sunroof device 10 further includes a front frame 17 made of resin and extending laterally along the front edge of the upper opening 3A to have two ends joined to the corresponding side drain rails 16, and a cross frame 18 made of metal and extending laterally along the rear edge of the upper opening 3A to have two ends joined to the corresponding panel guide rails 14, whereby the sunroof device 10 has a rectangular shape.

Left and right panel stays 20 each extending in the fore and aft direction are secured to lower surfaces of the respective side portions of the movable panel 11 so as to depend therefrom. Each panel stay 20 is supported by the corresponding panel guide rail 14 via a front slider 21 and a rear slider 22 that slidably engage the panel guide rail 14. The front slider 21 is integrally provided on the corresponding panel stay 20. On the other hand, the rear slider 22 is linked to the panel stay 20 via a known cam mechanism that allows the rear slider 22 to move relative to the panel stay 20 to cause the movable panel 11 to tilt, and also allows the rear slider 22 to engage the panel stay 20 such that the rear slider moves integrally with the panel stay 20 to cause the movable panel 11 to slide in the fore and aft direction. The left and right cam mechanism parts are configured to be symmetrical to each other. Thus, in the following description, the left cam mechanism part will be illustrated and described.

Figure 3:
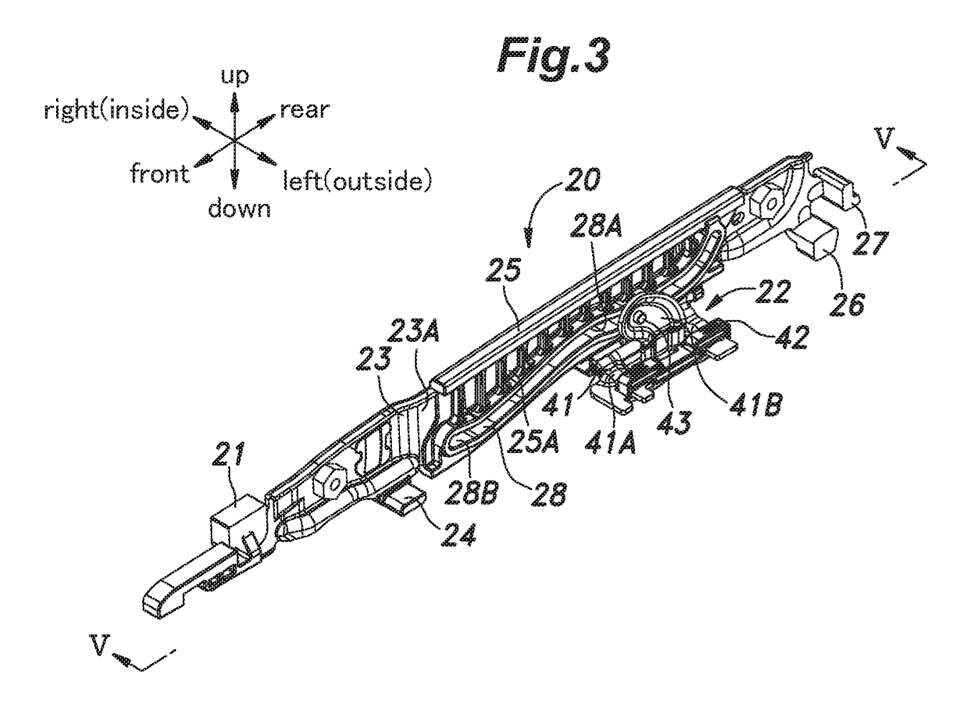
FIG. 3 is a perspective view of a left cam mechanism part shown in FIG. 2 as viewed from outside.
Figure 4:
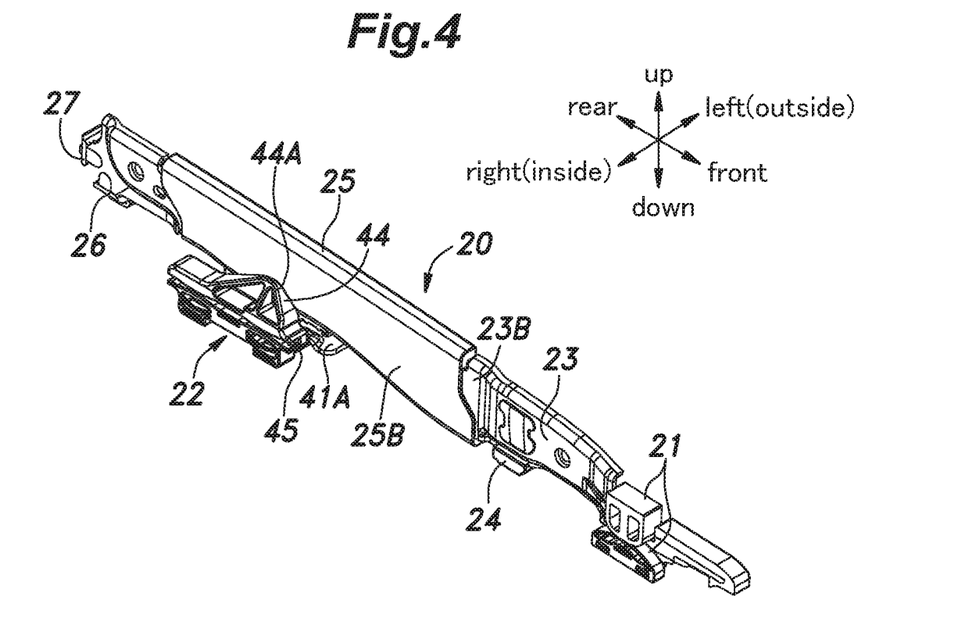
FIG. 4 is a perspective view of the left cam mechanism part shown in FIG. 2 as viewed from inside.

FIG. 3 is a perspective view of the left cam mechanism part shown in FIG. 2 as viewed from outside, FIG. 4 is a perspective view of the left cam mechanism part shown in FIG. 2 as viewed from inside. As shown in FIGS. 3 and 4, the panel stay 20 includes a main member 23 consisting of an elongated metallic plate extending in the fore and aft direction. The front slider 21, which is made of resin and protrudes inward, is fixed to a front end portion of the main member 23. A front guide pin 24 made of resin and protruding outward and a cam forming member 25 made of resin are fixed to an intermediate portion of the main member 23. A first rear guide pin 26 and a second rear guide pin 27 that are made of resin and protrude outward are fixed to a rear end portion of the main member 23. The front slider 21, the front guide pin 24, the cam forming member 25, the first rear guide pin 26, and the second rear guide pin 27 are all outsert molded parts that are fixed to the main member 23 by outsert molding.

Figure 5:
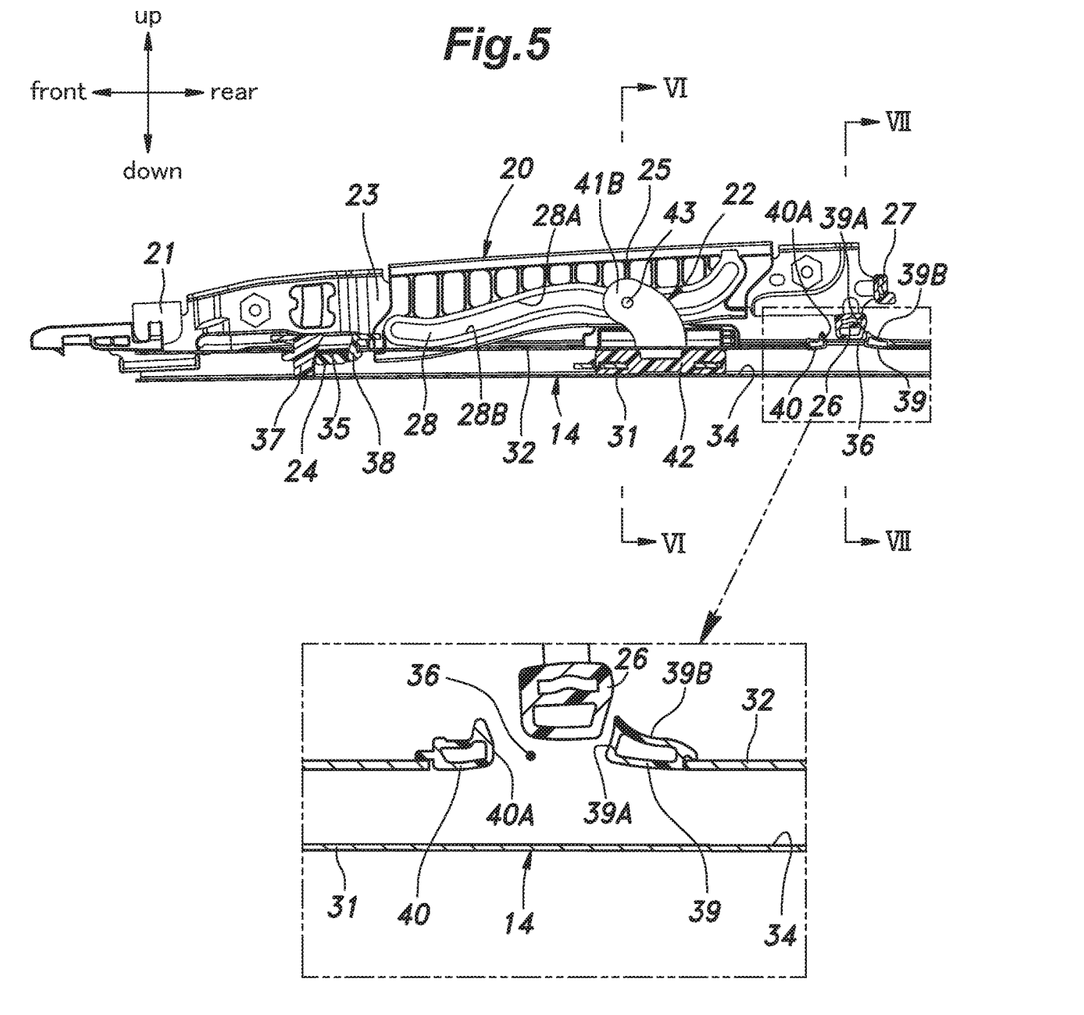
FIG. 5 is a side view of the cam mechanism part as viewed along section line V-V in FIG. 3.
Figure 6:
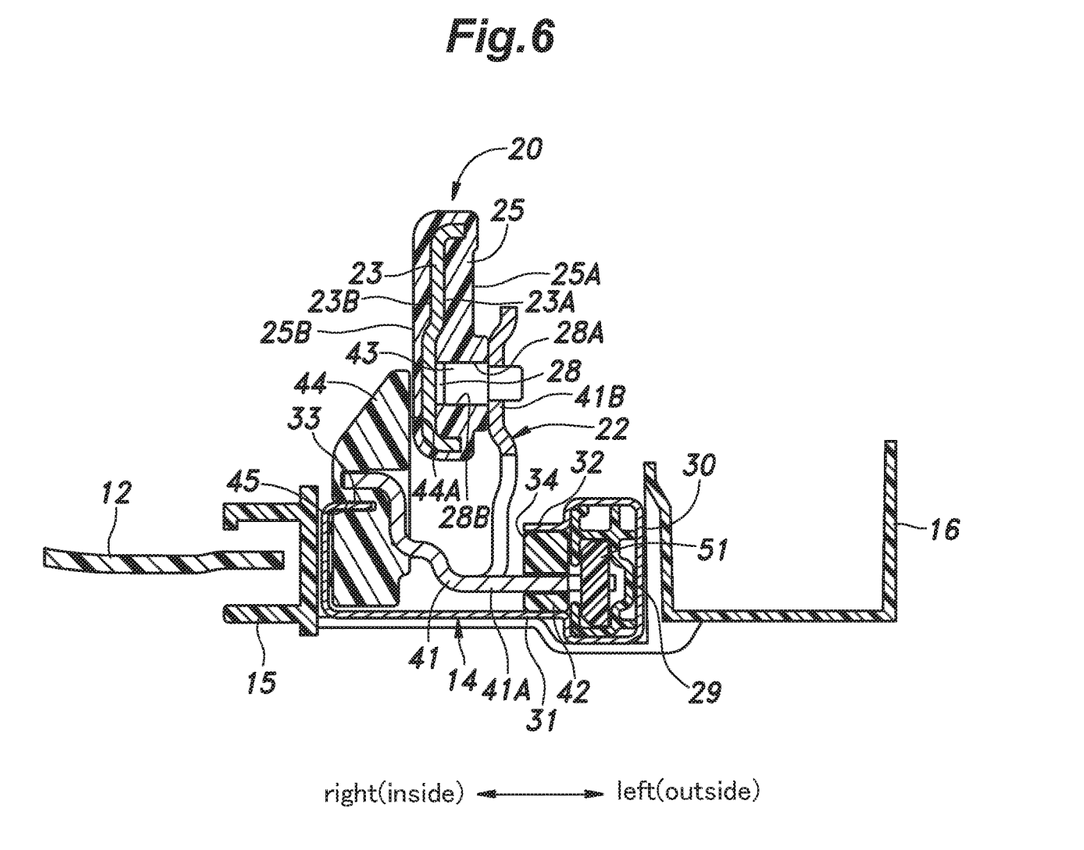
FIG. 6 is a sectional view taken along line VI-VI in FIG. 5.

FIG. 5 is a side view of the cam mechanism part as viewed along sectional line V-V in FIG. 3, and FIG. 6 is a sectional view taken along line VI-VI in FIG. 5. As shown in FIGS. 5 and 6, the cam forming member 25 is an outsert molded part surrounding the entire circumference of the main member 23 including an outer side surface 23A and an inner side surface 23B, and has an outer side surface 25A defining a wave-shaped cam groove 28 elongated in the fore and aft direction. The cam groove 28 constitutes a bottomed groove that opens outward, with the main member 23 serving as a bottom wall of the groove, and the upper surface and the lower surface of the bottomed groove serve as cam surfaces 28A, 28B.

Each panel guide rail 14 is a linear member formed by bending a metallic plate, such as an aluminum plate, to have a cross-sectional shape similar to that of a lipped steel channel. As shown in FIG. 6, the panel guide rail 14 includes a guide mounting portion 30 on an outermost part thereof, where the guide mounting portion 30 has a substantially rectangular cross-sectional shape and a belt guide member 29 made of resin is mounted therein. An inner lower part of the guide mounting portion 30A is continuous with a bottom wall 31 consisting of a bottom piece. An inner upper part of the guide mounting portion 30 is continuous with a first upper wall 32 consisting of a lip piece that opposes an outer edge portion of the bottom wall 31 at a predetermined vertical distance above the bottom wall 31. An inner edge of the bottom wall 31 is continuous with a second upper wall 33 consisting of a lip piece that opposes the inner edge portion of the bottom wall 31 at a predetermined vertical distance above the bottom wall 31. The bottom wall 31, the first upper wall 32, and the second upper wall 33 are parallel with one another. The bottom wall 31 and the first upper wall 32 define a guide groove 34 that opens inward.

Figure 7:
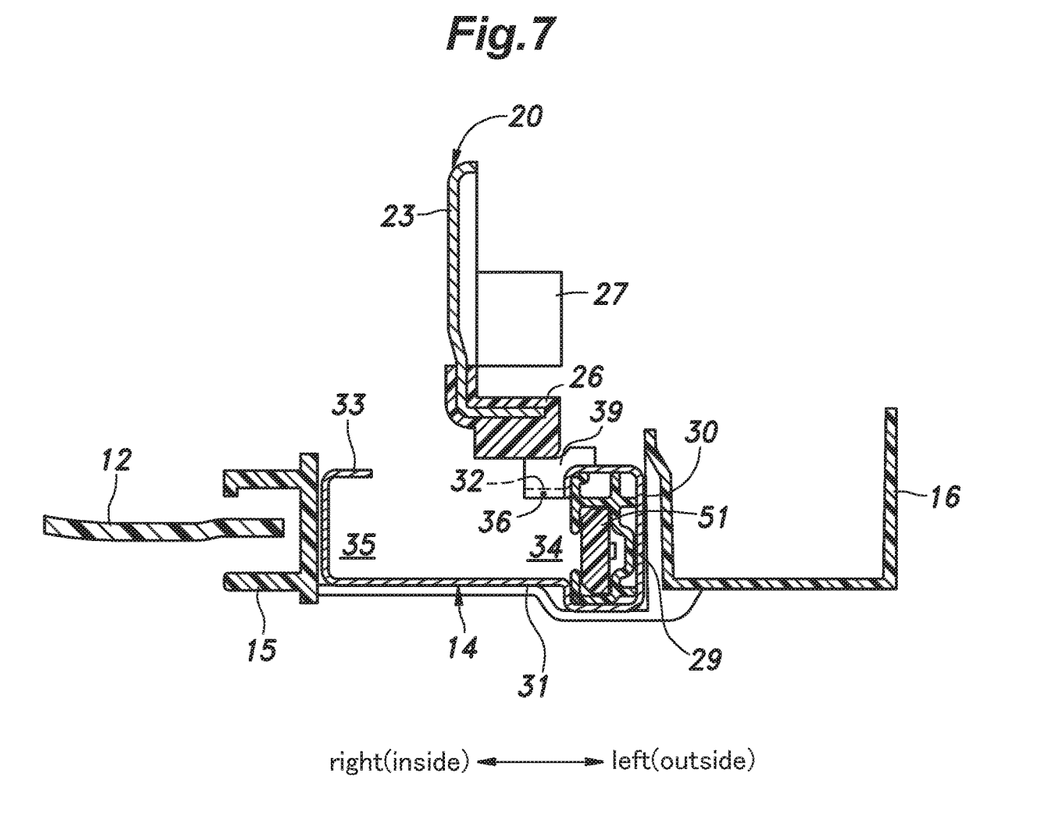
FIG. 7 is a sectional view taken along line VII-VII in FIG. 5.

FIG. 7 is a sectional view taken along line VII-VII in FIG. 5. As shown in FIGS. 5 and 7, the second rear guide pin 27 is formed at a position adjacent to the first rear guide pin 26 in a rearward and upward direction. The first rear guide pin 26 and the second rear guide pin 27 protrude outward from the outer surface of the main member 23 to such an extent that they reach the guide groove 34 but do not reach the guide mounting portion 30. The front guide pin 24, which is shown in FIG. 5 and FIG. 3, also protrude outward to such an extend that it reaches the guide groove 34 but does not reach the guide mounting portion 30.

As shown in FIGS. 5 and 7, a front opening part 35 and a rear opening part 36 are formed at positions on the first upper wall 32 of the panel guide rail 14 aligned with the front guide pin 24 and the first rear guide pin 26, respectively. Thereby, the front guide pin 24 and the first rear guide pin 26 can get into and out of the guide groove 34 through the front opening part 35 and the rear opening part 36, respectively.

As shown in FIG. 5, the front opening part 35 is defined by a first front lifting guide member 37 and a second front lifting guide member 38 which are made of resin and guide the lifting operation of the front guide pin 24. The first front lifting guide member 37 is provided on the first upper wall 32 at the front of the front opening part 35, and extends from the lower surface of the guide groove 34 to above the first upper wall 32. The second front lifting guide member 38 is provided on the first upper wall 32 at the rear of the front opening part 35, and extends from an upper part of the guide groove 34 to above the first upper wall 32. The first front lifting guide member 37 and the second front lifting guide member 38 are each formed as an integral molded part, and are attached to the first upper wall 32 by being fitted into front notches formed in the first upper wall 32.

The rear opening part 36 is defined by a first rear lifting guide member 39 and a second rear lifting guide member 40 which guide the lifting operation of the first rear guide pin 26. The first rear lifting guide member 39 is provided on the first upper wall 32 at the rear of the rear opening part 36, and extends from the lower surface of the first upper wall 32 to above the first upper wall 32. The second rear lifting guide member 40 is provided on the first upper wall 32 at the front of the rear opening part 36, and extends from the lower surface of the first upper wall 32 to above the first upper wall 32. The first rear guide pin 26 and the second rear lifting guide member 40 are each formed as a component made of resin integrally molded to having a hollow cross-sectional structure, and are attached to the first upper wall 32 by being fitted into rear notches formed in the first upper wall 32.

The first rear lifting guide member 39 has an inclined front surface 39A including an upper part that is inclined rearward and an inclined upper surface 39B that is curved such that a front part thereof is inclined upward and a more forward part thereof has a greater inclination relative to the upper surface of the first upper wall 32. The second rear lifting guide member 40 is provided with an inclined rear surface 40A including an upper part that is inclined forward.

As shown in FIG. 4, the front slider 21 slidably and tiltably engages the second upper wall 33 with a pair of arc surfaces that vertically sandwich the second upper wall 33 (FIG. 6) of the panel guide rail 14, and serves as a fulcrum in the tilting operation of the movable panel 11.

As shown in FIG. 6, the rear slider 22 includes a slider body 41 made of a metallic plate. The slider body 41 includes a base 41A extending laterally under across the panel stay 20, and a pin support 41B that extends upright from a laterally intermediate portion of the base 41A to oppose the outer side surface 25A of the cam forming member 25.

A cam follower pin 43 made of metal is secured to the pin support 41B. The cam follower pin 43 is a cantilever pin having one end fixed to the pin support 41B by crimping so as to protrude from the pin support 41B toward the panel stay 20, and slidably engages the cam surfaces 28A, 28B of the cam groove 28. It is to be noted that there is a space between the other end (free end) of the cam follower pin 43 and the main member 23 serving as a groove bottom wall of the cam groove 28, so that the other end of the cam follower pin 43 does not contact the main member 23.

The outer end of the base 41A of the rear slider 22 is inserted into the guide groove 34 defined between the bottom wall 31 and the first upper wall 32 of the panel guide rail 14 to reach the guide mounting portion 30. To a part of the base 41A aligned with the guide groove 34 is attached an engaging element 42 which is made of resin and slidable relative to the panel guide rail 14 along the guide groove 34.

The inner end of the base 41A of the slider body 41 extends upward to above the second upper wall 33, and a contact member 44 is fixed to this other end, where the contact member 44 is made of resin and has a flat outer side surface 44A that slidably contacts (opposes) an inner side surface 25B of the cam forming member 25. Thereby, the pin support 41B and the contact member 44 of the rear slider 22 laterally sandwich the cam forming member 25 so as to be movable in the fore and aft direction.

An inner side surface 44B of the contact member 44 is formed with a recessed groove 45. The recessed groove 45 engages the second upper wall 33 so as to be slidable in the fore and aft direction. Thereby, the rear slider 22 engages the panel guide rail 14 at both lateral sides thereof via the engaging element 42 and the recessed groove 45, whereby the sliding movement of the rear slider 22 in the fore and aft direction relative to the panel guide rail 14 is performed stably without skewing (distortion).

The belt guide member 29 of the panel guide rail 14 receives therein a corresponding one of left and right rack belts 51. Each of the left and right rack belts 51 is a flexible belt made of resin, and has a rear end portion connected (linked) to an outer end of the base 41A of the corresponding slider body 41. The left and right rack belts 51 each extends forward from the corresponding belt guide member 29, and as shown in FIG. 2, movably engage a pair of front and rear belt guide grooves 52 formed in the front frame 17, respectively. An electric motor 53 and a pinion 54 driven to rotate by the electric motor 53 are mounted on the front frame 17. The pinion 54 meshes with the racks (not shown) of the left and right rack belts 51. Thereby, the left and right rack belts 51 are driven by the electric motor 53, such that the left and right rear sliders 22 are moved by the rack belts 51 in the fore and aft direction in synchronization with each other.

Figure 8:
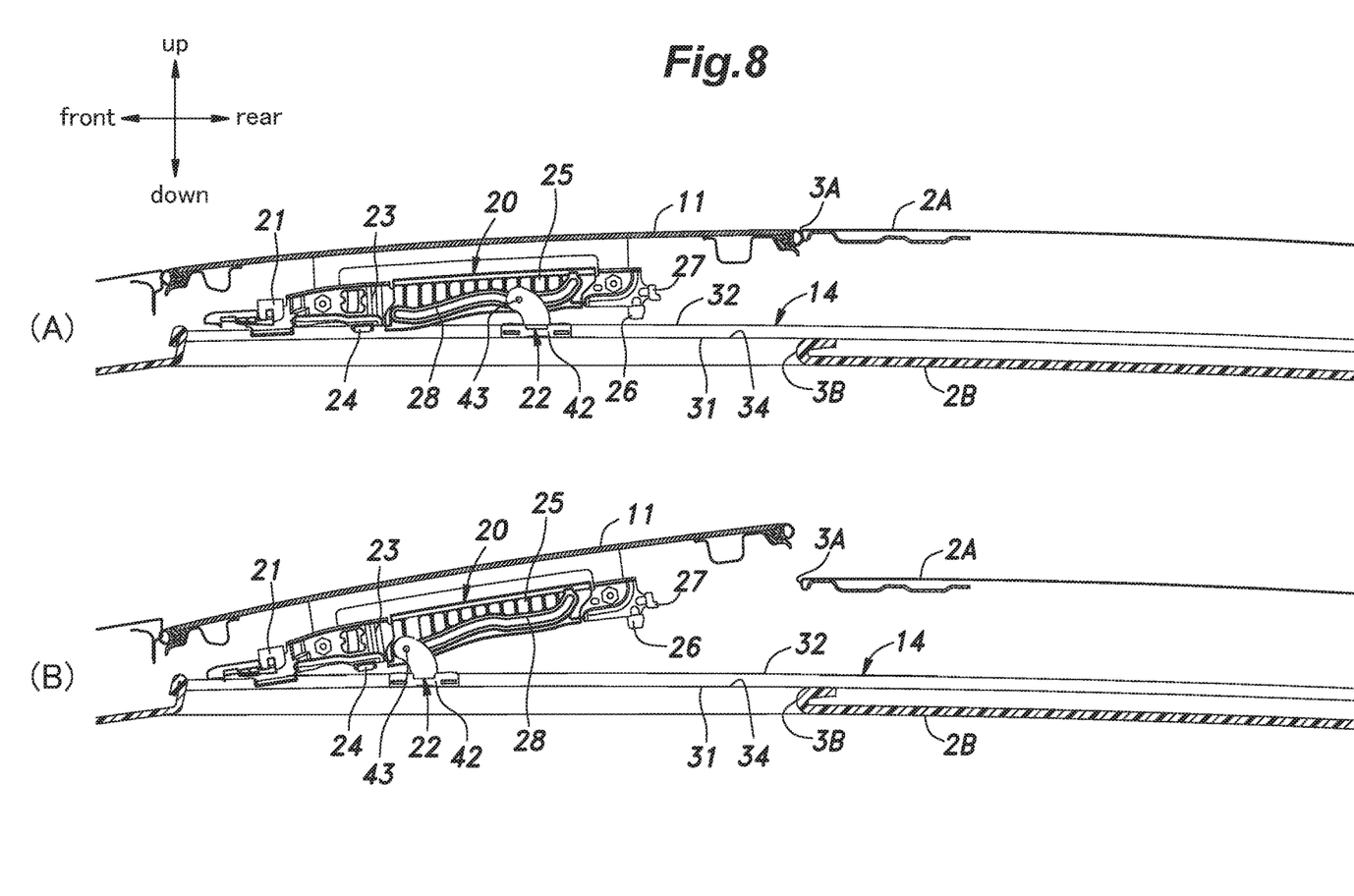
FIG. 8 is a left side view showing a tilting operation of the sunroof device.

FIG. 8 is a left side view showing a tilting operation of the sunroof device 10. Part (A) of FIG. 8 shows a state in which the movable panel 11 is in the closed position where the movable panel 11 closes the upper opening 3A of the roof 2. As shown in part (A) of FIG. 8, when the movable panel 11 is in the closed position, the rear slider 22 places the cam follower pin 43 in an intermediate portion of the cam groove 28 in the fore and aft direction. When the rear slider 22 is driven forward from this state, the cam follower pin 43 moves forward in the cam groove 28, whereby the panel stay 20 is tilted such that the rear part thereof is raised with the front slider 21 serving as a fulcrum. Thereby, as shown in part (B) of FIG. 8, the movable panel 11 is moved to a tilt-up position where the rear part thereof has been raised up. If the rear slider 22 is driven rearward from this state, the movable panel 11 returns to the closed position shown in part (A) of FIG. 8.

As described above, as the panel stay 20 moves in connection with the sliding of the rear slider 22, the movable panel 11 undergoes tilting movement between the closed position (part (A) of FIG. 8) and the tilt-up position (part (B) of FIG. 8).

FIG. 9 is a left side view showing an opening and closing operation of the sunroof device 10. Similarly to part (A) of FIG. 8, part (A) of FIG. 9 shows a state in which the movable panel 11 is in the closed position. When the rear slider 22 is driven rearward from the state shown in part (A) of FIG. 9, the cam follower pin 43 moves rearward in the cam groove 28, whereby the panel stay 20 is tilted such that the rear part is lowered with the front slider 21 serving as a fulcrum. Thereby, as shown in part (B) of FIG. 9, the movable panel 11, which is tilted together with the panel stay 20, is moved as a whole to a down position which is lower than the closed position. As the rear slider 22 is driven further rearward, the cam follower pin 43 engages the cam forming member 25 near the rear end of the cam groove 28, so that the panel stay 20 is caused to integrally slide rearward along the guide groove 34. Thereby, the movable panel 11 slides rearward under the outer roof panel 2A, while keeping the attitude, to an open position as shown in part (C) of FIG. 9 where the upper opening 3A is opened.

Conversely, when the rear slider 22 is driven forward from the state shown in part (C) of FIG. 9 where the movable panel 11 is in the open position, the cam follower pin 43 engaging the cam forming member 25 near the rear end of the cam groove 28 causes the panel stay 20 to integrally slide forward along the guide groove 34. As a result, the movable panel 11 slides forward to the down position shown in part (B) of FIG. 9. If the rear slider 22 is further driven forward, the cam follower pin 43 moves forward from near the rear end of the cam groove 28, whereby the panel stay 20 is tilted such that the rear part thereof is raised with the front slider 21 serving as a fulcrum. Thereby, the movable panel 11 is lifted up to return to the closed position.

As described above, as the panel stay 20 moves in connection with the sliding of the rear slider 22, the movable panel 11 undergoes tilting movement between the closed position (part (A) of FIG. 9) and the down position (part (B) of FIG. 9), and slides between the down position (part (B) of FIG. 9) and the open position (part (B) of FIG. 9).

FIG. 10 is an enlarged view of the cam mechanism part when the sunroof device 10 undergoes the opening and closing operation. Similarly to part (A) of FIG. 9, part (A) of FIG. 10 shows the state in which the movable panel 11 is in the closed position. Similarly to part (B) of FIG. 9, part (B) of FIG. 10 shows the state in which the movable panel 11 is in the down position. Part (C) of FIG. 10 shows a state in which the movable panel 11 is in a position slightly more rearward than the down position.

As shown in part (A) of FIG. 10, when the movable panel 11 is in the closed position, both of the first rear guide pin 26 and the second rear guide pin 27 are positioned above the first upper wall 32 of the panel guide rail 14. On the other hand, the front guide pin 24 is positioned in the guide groove 34, and sandwiched by the first front lifting guide member 37 and the second front lifting guide member 38 in the fore and aft direction. Thereby, movement of the movable panel 11 in the fore and aft direction is restricted.

When the rear slider 22 is driven rearward from this state such that the panel stay 20 is tilted down as shown in part (B) of FIG. 10, the front guide pin 24 moves to the lower part of the guide groove 34 while being guided by the first front lifting guide member 37 and the second front lifting guide member 38, and the first rear guide pin 26 enters the guide groove 34 through the rear opening part 36. At this time, the first rear guide pin 26 is guided by the inclined front surface 39A of the first rear lifting guide member 39 and the inclined rear surface 40A of the second rear lifting guide member 40. Further, when the movable panel 11 is lifted down, the second rear guide pin 27 abuts against the inclined upper surface 39B of the first rear lifting guide member 39 and slides on the inclined upper surface 39B. Thereby, the movement of the movable panel 11 is smoothly switched from the downward movement to the rearward sliding movement. In addition, hitting sound produced when the first rear guide pin 26 abuts against the bottom wall 31 is reduced. In the state where the movable panel 11 has moved to the down position, the second rear guide pin 27 is positioned above the first upper wall 32 while the first rear guide pin 26 is positioned below the first upper wall 32 and above the bottom wall 31; namely, in the guide groove 34.

As the rear slider 22 is further driven rearward, as shown in part (C) of FIG. 10, the panel stay 20 moves rearward while being guided by the panel guide rail 14 with the front guide pin 24 and the first rear guide pin 26 received in the guide groove 34. Thereby, vertical rattling of the panel stay 20 is suppressed. When the movable panel 11 is between the down position and the open position, the front guide pin 24 and the first rear guide pin 26 are received in the guide groove 34, while the second rear guide pin 27 is positioned above the first upper wall 32.

When the rear slider 22 is driven forward from a state in which the movable panel 11 is on the side of the open position (part (C) of FIG. 9) relative to the down position, because the first rear guide pin 26 is positioned in the guide groove 34, the panel stay 20 moves forward while keeping the attitude to reach the state shown in part (B) of FIG. 10 through the state shown in part (C) of FIG. 10. At this time, as the movable panel 11 slides forward, the second rear guide pin 27 abuts against the inclined upper surface 39B of the first rear lifting guide member 39 and slides over the inclined upper surface 39B, such that the sliding movement of the movable panel 11 is smoothly converted into an upward movement (upward tilting movement).

Next, operations and effects of the lifting guide mechanism for the sunroof device 10 will be described.

As shown in FIG. 5, the second rear guide pin 27 is provided behind and above the first rear guide pin 26, and as shown in part (B) and (A) of FIG. 10, the second rear guide pin 27 is guided by the first rear lifting guide member 39 when the movement of the movable panel 11 is switched between sliding and tilting. Therefore, there is no need for a member for guiding the first rear guide pin 26 in the guide groove 34, and the panel guide rail 14 having a single-level structure in that both of the rear slider 22 and the first rear guide pin 26 are guided by the common guide groove 34 is realized. Accordingly, the lifting guide mechanism for the sunroof device 10 can be reduced in weight, thickness, and cost.

The first rear lifting guide member 39 has the inclined upper surface 39B which is curved such that a more forward part thereof has a greater inclination relative to the upper surface of the first upper wall 32 and on which the second rear guide pin 27 makes sliding contact such that, when the movable panel 11 moves through the down position, the second rear guide pin 27 is guided by the curved guide surface of the first rear lifting guide member 39. Thereby, the movement of the movable panel 11 is smoothly switched between sliding and tilting.

The first rear lifting guide member 39 has the inclined front surface 39A including an upper part that is inclined rearward to guide the rear part of the first rear guide pin 26, whereby when the movable panel 11 moves from the closed position (part (A) of FIG. 10) to the down position (part (B) of FIG. 10), the rear part of the first rear guide pin 26 is guided by the inclined front surface 39A of the first rear lifting guide member 39. Thereby, the first rear guide pin 26 enters the guide groove 34 reliably.

The second rear lifting guide member 40 having the inclined rear surface 40A including an upper part that is inclined forward to guide the front part of the first rear guide pin 26 is provided on the first upper wall 32 so as to project upward at front of the rear opening part 36, whereby, when the movable panel 11 moves from the closed position (part (A) of FIG. 10) to the down position (part (B) of FIG. 10), the front part of the first rear guide pin 26 is guided by the inclined rear surface 40A of the second rear lifting guide member 40. Thereby, the first rear guide pin 26 enters the guide groove 34 reliably.

Since the first rear lifting guide member 39 and the second rear lifting guide member 40 are parts made of resin having a hollow cross-sectional structure, they can easily undergo elastic deformation, whereby an impact on the first rear guide pin 26 or the second rear guide pin 27 can be absorbed by the elastic deformation of these members. Therefore, there is no need to provide an additional impact absorbing member such as a rubber elastic member, and the structure can be simplified.

Since the first rear lifting guide member 39 and the second rear lifting guide member 40 are integrally molded, the number of components can be reduced, and in addition, the mounting of these members to the panel guide rail 14 is facilitated.

In the foregoing, the present invention has been described in terms of the concrete embodiment thereof, but the present invention is not limited to the foregoing embodiment and various alterations and modifications may be made. For instance, in the foregoing embodiment, the sunroof device 10 was described as being used for the automobile 1 as an example, but the sunroof device 10 may be widely used for railway vehicles, etc. Further, in the foregoing embodiment, the movable panel 11 of the sunroof device 10 is provided so as to open the opening by moving rearward of the automobile 1, but the movable panel 11 may be provided so as to move forward or sideways of the automobile 1. In this case, the frontward or lateral direction of the automobile 1 becomes the rearward direction of the sunroof device 10. Besides, the concrete structure, arrangement, number, angle, material, etc. of the various members and parts may be appropriately changed without departing from the spirit of the present invention. Also, not all of the structural elements shown in the above embodiment are necessarily indispensable and they may be selectively used as appropriate.

Glossary 1 automobile
2 roof
3A upper opening (opening)
10 sunroof device
11 movable panel
14 panel guide rail
20 panel stay 22 rear slider
26 first rear guide pin
27 second rear guide pin
28 cam groove
31 bottom wall
32 first upper wall
36 rear opening part (opening part)
39 first rear lifting guide member (first lifting guide member)
39A inclined front surface
39B inclined upper surface
40 second rear lifting guide member (second lifting guide member)
40A inclined rear surface

The invention claimed is:

1. A lifting guide mechanism for an inner-slide sunroof device, the sunroof device comprising:
a movable panel for opening and closing an opening formed in a roof of a vehicle;
a guide rail mounted to the roof and having an upper wall and a bottom wall to define a laterally opening guide groove;
a slider slidably provided in the guide groove; and
a panel stay secured to the movable panel and configured to move in connection with sliding of the slider,
wherein, in accordance with a movement of the panel stay in connection with sliding of the slider, the movable panel is lifted or tilted between a closed position in which the opening is closed and a down position that is lower than the closed position, and is caused to slide between the down position and an open position which is behind the down position and in which the opening is opened,
the lifting guide mechanism comprising:
a first guide pin provided on a rear part of the panel stay so as to project laterally and received in the guide groove when the movable panel is positioned between the down position and the open position;
a second guide pin provided on a part of the panel stay adjacent to the first guide pin in a rearward and upward direction so as to project laterally, the second guide pin being positioned above the upper wall when the movable panel is positioned between the down position and the open position;
an opening part formed in the upper wall to allow the first guide pin to get in and out of the guide groove when the movable panel moves between the down position and the closed position; and
a first lifting guide member provided on the upper wall so as to project upward at rear of the opening part to guide the second guide pin when a movement of the movable panel is switched between sliding and lifting or tilting.

2. The lifting guide mechanism according to claim 1, wherein the first lifting guide member has an inclined upper surface with which the second guide pin makes sliding contact, the inclined upper surface being curved such that a more forward part thereof has a greater inclination relative to an upper surface of the upper wall.

3. The lifting guide mechanism according to claim 1, wherein the first lifting guide member has an inclined front surface that guides a rear part of the first guide pin when the movable panel moves from the closed position to the down position, the inclined front surface including an upper part that is inclined rearward.

4. The lifting guide mechanism according to claim 1, further comprising a second lifting guide member provided on the upper wall to project upward at front of the opening part to guide a front part of the first guide pin when the movable panel moves from the closed position to the down position, the second lifting guide member having an inclined rear surface including an upper part that is inclined forward.

5. The lifting guide mechanism according to claim 4, the first lifting guide member and the second lifting guide member are parts made of resin and having a hollow cross-sectional structure.

6. The lifting guide mechanism according to claim 4, the first lifting guide member and the second lifting guide member are integrally molded.

* * * * *